United States Patent [19]
Vandling

[11] 3,916,098
[45] Oct. 28, 1975

[54] FACSIMILE RECEIVER WITH IMPROVED DEMODULATOR

[75] Inventor: John M. Vandling, Pleasantville, N.Y.

[73] Assignee: Exxon Research & Engineering Co., Linden, N.J.

[22] Filed: Feb. 7, 1974

[21] Appl. No.: 440,392

[52] U.S. Cl. ................ 178/7.3 R; 178/6; 178/6.6 R; 178/DIG. 7; 329/104; 329/110

[51] Int. Cl.$^2$... H04N 1/40; H03D 3/14; H03K 9/06

[58] Field of Search......... 178/6, 6.6 R, DIG. 7, 7.3; 329/104, 110

[56] References Cited

UNITED STATES PATENTS 2,956,115 10/1960 Hefele ............................ 178/6.6 R
3,467,772 9/1969 Crane .................................... 178/6

*Primary Examiner*—Howard W. Britton
*Attorney, Agent, or Firm*—N. Norris

[57] ABSTRACT

FM signals within a predetermined bandwidth representing light-dark variations in a document are transferred over a communications network to a facsimile receiver. Demodulation of the FM signals is accomplished by a single shot multivibrator which is triggered to the astable state in response to trigger pulses representing the frequency of the FM signals. Reset means responsive to the trigger pulses reset the single shot multivibrator to the astable state when the frequency of the trigger pulses is sufficiently high such that trigger pulses occur while the multivibrator is in a previously initiated astable state. An average DC voltage detector is connected to the output of the multivibrator such that the average DC voltage represents the ratio of the astable state duration to the stable state duration.

5 Claims, 16 Drawing Figures

FACSIMILE RECEIVER WITH IMPROVED DEMODULATOR

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing the light-dark variations in the document being scanned. These information-bearing signals have been transmitted over the communications network to a facsimile receiver where the information-bearing signals are converted to marks and images on a copy medium so as to form a copy which is a reasonable facsimile of the original document.

In several commercially available facsimile systems, the information-bearing signals which are transmitted over the communications network are FM (frequency modulated) signals. In general, these signals lie in a band between 1,500 Hz. and 2,400 Hz. which represents a portion of the audio range which is transmitted over ordinary telephone lines. Where this frequency range is utilized, the 1,500 Hz. signal usually represents a white level, the 2,400 Hz. signal represents a black level and signals in the frequency range between 1,500 Hz. and 2,400 Hz. represent varying degrees of gray. In the alternative, the gray scale may be eliminated or reduced such that frequencies in the lower portion of the bandwidth toward 1,700 Hz. and below may represent white and frequencies in the upper portion of the bandwidth toward 2,200 Hz. and above may represent black.

One low cost, and extremely effective technique for demodulation of the FM signals, involves the use of one or more single shot multivibrators. As shown in U.S. copending patent application Ser. No. 417,797, filed Nov. 21, 1973, a single shot multivibrator is triggered into its astable state in response to trigger pulses generated for each zero crossing of the FM signals. When the received FM signals approach the lower portion of the FM bandwidth (1,500 Hz.), the trigger pulses corresponding to the zero axis crossing of the FM signals triggers or sets the single shot multivibrator to the astable state such that the astable state duration or duty cycle of the multivibrator represents a lesser portion of the multivibrator cycle which includes the stable state duration. When the frequency of the FM signals approaches the other end of the bandwidth (approximately or equal to 2,400 Hz.), the astable state duration or duty cycle of the multivibrator now represents a larger portion of the multivibrator cycle. This variation in ratio in the duty cycle or astable state duration to the stable state duration may be utilized to control the writing at the facsimile receiver by detecting the average DC value from the output of the multivibrator. When the average DC value is relatively small, corresponding to the reception of 1,500 Hz. signals, the average DC voltage is utilized to control the writing mechanism of the facsimile receiver so as to produce white on the copy medium. When the FM signal has a frequency of 2,400 Hz. representing black, the average DC value which is relatively high is utilized to control the writing mechanism in the receiver so as to produce black on the copy medium.

In the absence of any irregularities in the FM signal the foregoing single shot multivibrator demodulator system performs very well. However, certain disturbances in the FM carrier signal may produce zero axis crossings at a rate corresponding to frequencies in excess of 2,400 Hz. which can produce errors on the copy medium. One particularly likely source of such a disturbance is acoustic ringing where an acoustic coupler is utilized between the communications network or telephone line and the receiver itself. When acoustic ringing occurs during the reception of black signals, white holes may be left in portions of the copy which should be reproduced as black. Such holes have a very substantial effect on the visual acceptance of the facsimile. Of course, various disturbances such as electrical noise or crosstalk can produce these undesirable white holes in the facsimile.

U.S. Pat. No. 3,467,772 — Crane discloses the use of a pair of parallel single shot multivibrator circuits which are triggered by pulses having a frequency proportional to (double) the frequency of the FM signals. The Crane system also produces undesirable white holes in response to a high frequency disturbance such as that caused by acoustic ringing since the single shot multivibrators cannot be reset while in the astable state.

SUMMARY OF THE INVENTION

It is an object of this invention to provide an improved facsimile receiver capable of faithfully reproducing a document.

In accordance with this object, the receiver comprises trigger means responsive to the light-dark signals representing light-dark variations in a document so as to generate trigger signals having a variable frequency representing light-dark variations in a document. Timing means are coupled to the trigger means for timing out periods of predetermined duration where the timing periods are initiated in response to the trigger signals. Reset means are coupled to the trigger means and the timing means for resetting the timing means in response to the trigger signals occurring during the timing periods. Detector means are coupled to the output of the timing means for generating a writing control signal varying as a function of the ratio of timing periods to the time elapsed between timing periods. Writing means are coupled to the output of the timing means for marking on a copy medium in response to the writing control signal.

In a particularly preferred embodiment of the invention, the timing means comprises a capacitor which is charged and discharged in response to the reset means. The timing means further comprises a flip-flop set in response to the trigger signals, a reference voltage and a voltage comparator coupled to the reference voltage and the capacitor for comparing the reference voltage with the charge on the capacitor and automatically resetting the flip-flop when the charge on the capacitor reaches a predetermined level. Switch means are coupled to the reset means for discharging the capacitor in response to the trigger signals. The output of the flip-flop is coupled to the detector means.

DETAILED DESCRIPTION OF A PREFERRED EMBODIMENT

Figure 1:
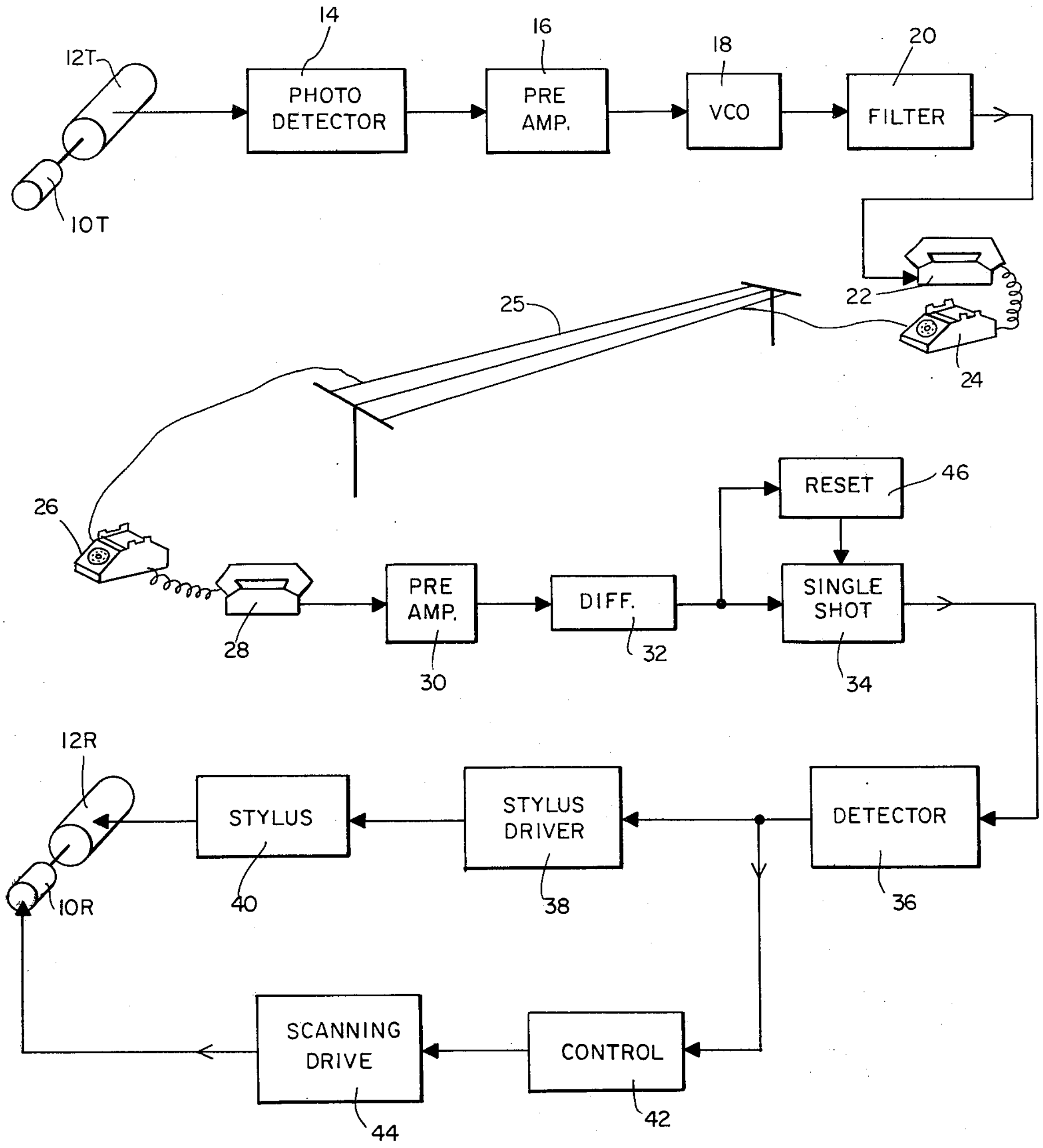
FIG. 1 is a block diagram of the facsimile system depicting one embodiment of the invention.

Referring now to the facsimile system shown in FIG. 1, a facsimile transmitter comprises a drum 12T rotated by a motor 10T so as to create a relative scanning movement between a document carried by the drum 10T and a scanning head not shown. As the scanning head is advanced axially along the drum 12T and the drum rotates about its axis, successive paths on the document are illuminated and variations in light intensity due to the reflectivity and absorption of the document are scanned by a photodetector 14. The photodetector 14 then converts these variations in light intensity which are a function of the reflectivity or absorption of the scanned document into electrical signals. These electrical signals are amplified at a preamplifier 16 and utilized to control a VCO (voltage controlled oscillator) 18 to generate FM (frequency modulated) signals representing the information content of the document carried by the drum 12T. The frequency modulated signals are then conditioned by a filter 20 before being applied to an acoustical coupler 22 which is associated with a conventional telephone handset 24.

The FM carrier is transmitted by suitable means such as conventional telephone lines 25 to a facsimile receiver which is coupled to another conventional telephone handset 26 and an associated acoustical coupler 28. The receiver includes a preamplifier 30.

The FM carrier which is amplified by the preamplifier 30 is applied to a differentiating-frequency doubling circuit 32 to generate trigger signals or pulses in response to each zero axis crossing of the FM carrier. The output of the differentiating-frequency doubling circuit 32 is applied to a single shot multivibrator 34 and a detector circuit 36 for determining the average DC value of the single shot output. The writing control signal generated at the output of the detector 36 is then applied to a driver 38 for a stylus 40 associated with a movable head (not shown) juxtaposed to a copy medium carried by a drum 12R. Relative movement between the copy medium and the head is achieved by rotating the drum 12R by means of a motor 10R and advancing the head axially along the drum.

In accordance with this invention, a reset circuit 46 is coupled to the output of the differentiating-frequency doubling cirucit 32 and the single shot multivibrator 34. The reset circuitry 46 is capable of resetting the timing period as represented by the astable state duration of the single shot 34 in response to each trigger pulse. In other words, the astable state of the single shot 34 will continue at least a predetermined length of time after each trigger signal. The operation of the single shot 34 and the reset circuitry 46 will now be described in further detail with reference to FIG. 2.

Figure 2:
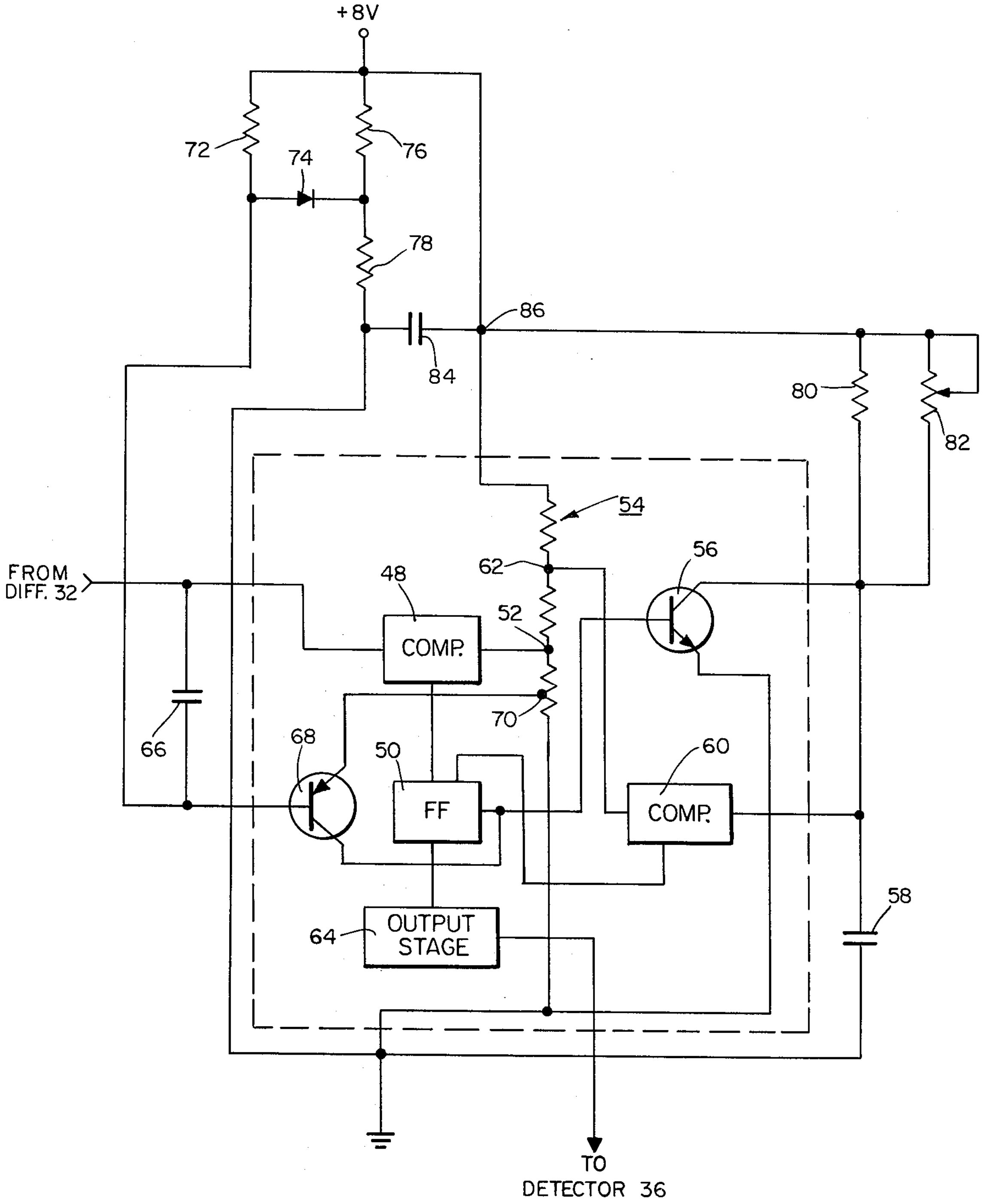
FIG. 2 is a schematic circuit diagram of the single shot and reset circuitry shown in FIG. 1.

As shown in FIG. 2, the single shot comprises a comparator 48 having an output coupled to a flip-flop 50, one input coupled to the output of the differentiating-frequency doubling circuit 32 and the other input coupled to a tap 52 in a resistive voltage divider 54 so as to provide a voltage reference for comparison with the input trigger pulses. When a trigger pulse is applied to the first input of the comparator 48, the output from the comparator sets the flip-flop 50. Simultaneously, the flip-flop 50 removes a positive voltage from the base of a switching transistor 56 so as to permit a timing capacitor 58 coupled between the collector of the transistor 56 and ground to charge.

The single shot multivibrator 34 further comprises a comparator 60 having one input coupled to the capacitor 58 and another input suitably referenced by the voltage divider 54 at a tap 62. When the charge on the timing capacitor 58 reaches a predetermined level, the comparator 60 will produce an output so as to reset the flip-flop 50 and thereby apply a positive voltage to the base of the switching transistor 56 so as to discharge the capacitor 58. The output from the flip-flop 50 is applied to an output stage 64 which produces a voltage which is detected by the average DC voltage detector 36.

The reset circuitry comprises a capacitor 66 coupled to the base of a switching transistor 68 which has an emitter coupled to a tap 70 on the voltage divider 54 such that a negative voltage applied to the base of the transistor 68 will cause the transistor 68 to conduct and this in turn will raise the base of the transistor 56 to a sufficiently positive level so as to cause the transistor 56 to conduct and discharge the capacitor 58. Normally, the base of the transistor 68 is maintained at a positive level by connection of the base and the capacitor 66 to the junction of a resistor 72 and a diode 74. When the input to the comparator 48 is positive, e.g., +8 volts, the capacitor 66 charges to a voltage, e.g., 3.3 volts, assuming that resistors 76 and 78 of the voltage divider connected to the diode 74 are of equal value. When the input to the comparator 48 drops to 0 volts during the trigger pulse period, the base of the transistor 68 is driven negative, 3.3 volts, at least momentarily, since the capacitor 66 remains charged at least momentarily. Once the capacitor 66 has discharged and the transistors 68 and 56 are rendered nonconductive, the capacitor 58 begins to charge again through resistors 82 (and a shunt resistor) with the rate of charge being adjustable by means of the tap in the resistor 82. A power supply filter capacitor 84 is provided between +9 volts and ground.

Assuming a detector circuit designed to demodulate FM signals within the bandwidth from 1,500 to, but not exceeding 2,400 Hz., the astable state duration or astable pulse width may not exceed 1/4800 where 4,800 is the frequency (in Hz.) of the zero axis crossings and trigger pulses for an FM carrier frequency of 2,400 Hz., i.e., the astable state pulse width may not exceed 209 microseconds. In the circuit of FIG. 2, the astable pulse width is established by the component values of the resistor 80, the resistor 82, the capacitor 58 and the tap setting on the resistor 82.

In practice, the maximum astable pulse width should be less than that permitted by the highest frequency to be detected (2,400 Hz.). Therefore, the circuit of FIG. 2 has been adjusted such that the astable pulse width is 189 microseconds which corresponds to a trigger pulse frequency of 5,300 Hz. produced by an FM carrier frequency of 2,650 Hz. In other words, the astable pulse width is approximately 10% less than the theoretical maximum stable pulse width permitted for an FM carrier frequency of 2,400 Hz. Accordingly, the duty cycle for a 2,400 Hz. FM carrier frequency is 189/209 or 90.4 percent. The duty cycle of a 1,500 Hz. FM carrier frequency is 189/333 or 56.5 percent where the duty cycle is defined as the ratio of the astable pulse width to the sum of the astable pulse width plus the stabe state duration of the single shot multivibrator.

The FM detector 36 measures the average DC value of the single shot multivibrator output and develops a DC potential that is directly related (proportional) to the duty cycle of the single shot multivibrator. The maximum DC potential is developed by the detector 36 when the duty cycle is 100 percent or in the case of the circuit of FIG. 2, when the FM carrier frequency is at 2,650 Hz. Thus signals between 2,400 Hz. corresponding to black and 2,650 Hz. cause the writing stylus to continue marking at the maximum black level with no degradation of copy quality since the DC potential developed by the detector 36 increases with increasing duty cycle up to 100 percent. However, in the absence of the reset capability provided by this invention, signals in excess of 2,650 Hz. which can occur as the result of acoustic ringing during the reception of black signals cause an unstable and erratic operation of the single shot multivibrator so as to substantially reduce the duty cycle and correspondingly decrease the DC potential developed which in turn results in an unacceptable degradation of facsimile quality. By providing a reset cpability in accordance with this invention, stable operation of the single shot multivibrator is achieved at frequencies in excess of the 2,650 Hz. "cut-off" so as to maintain a high duty cycle and assure the development of a large DC potential by the detector 36.

In order to provide a more graphic explanation of the advantages to be derived from the use of the reset circuitry in combination with the single shot multivibrator 34, reference will now be made to waveforms shown in FIG. 3.

Figure 3:
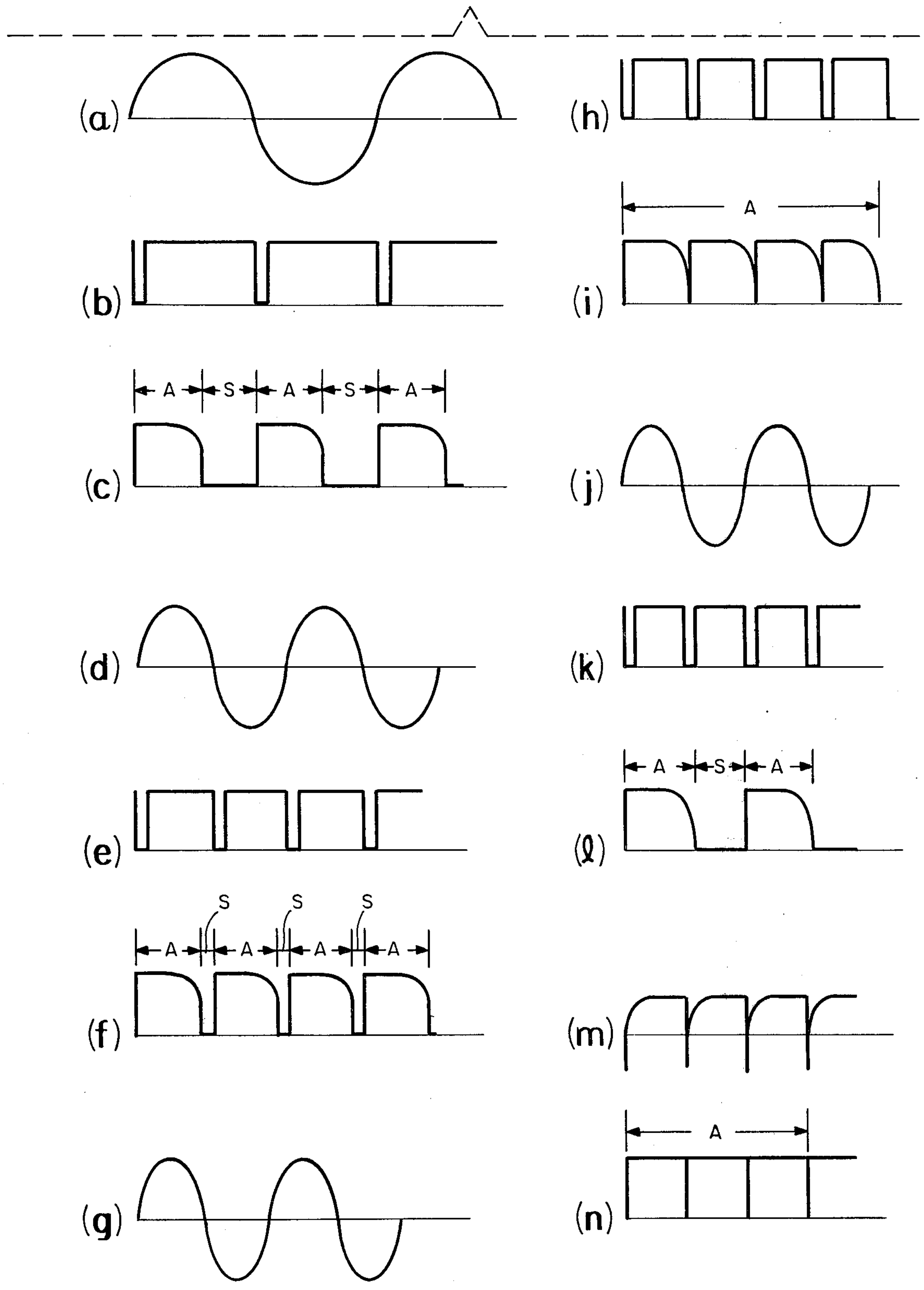
FIGS. 3*a*, 3*b*, 3*c*, 3*d*, 3*e*, 3*f*, 3*g*, 3*h*, 3*i*, 3*j*, 3*k*, 3*l*, 3*m* and 3*n* are waveform diagrams comparing the operation of the circuit shown in FIG. 1 and FIG. 2 with and without the reset circuitry.

The operation of the receiver circuitry of FIG. 1 including the single shot multivibrator of FIG. 2 while receiving a "white" 1,500 Hz. signal is depicted by waveforms *a*, *b* and *c* of FIG. 3 where the waveform *a* is the 1,500 Hz. sinusoidal FM carrier to be demodulated. Waveform *b* depicts the generation of trigger pulses at the zero axis crossings of the waveform *a* which are applied to the input of the single shot multivibrator 34 from the differentiating circuit 32 as shown in FIGS. 1 and 2. Note that the frequency of the trigger pulses is 3,000 Hz. or twice the 1,500 Hz. frequency of the waveform *a*. Waveform c depicts the output from the single shot multivibrator 34 shown in FIGS. 1 and 2. The multivibrator output in waveform *c* is characterized by an astable pulse width A of approximately 189 microseconds and a stable state duration S where the astable or timing state of the multivibrator is initiated by the negative going edge of the trigger pulses. As shown, the duty cycle of the multivibrator output in waveform *c* is approximately 56 percent.

Similarly, waveforms *d*, *e* and *f* depict a 2,400 Hz. sinusoidal FM carrier, 4,800 Hz. trigger signals and a multivibrator output having a 90 percent duty cycle respectively. Note that the astable state pulse width A in waveform *f* is the same as the astable state pulse width A in waveform *c* (189 microseconds) so that the duty cycle varies as a function of the stable state duration S with the average DC value of the waveform f representing a substantial increase over the average DC value of the waveform *c*.

Waveforms *g*, *h* and *i* represent the FM carrier, the trigger pulses and the multivibrator output respectively at an FM carrier frequency of 2,650 Hz. It will now be seen that the duty cycle of the multivibrator output of waveform *i* is essentially 100 percent so as to represent the maximum average DC value which can be obtained from the multivibrator output.

The waveforms *a–i* all represent normal operation of the receiver, i.e., stable operation of the multivibrator is achieved. However, when the frequency of the received signals exceed 2,650 Hz., the cut-off frequency for the multivibrator circuit of FIG. 2, the multivibrator operation becomes unstable and erratic in the absence of the reset circuitry shown in FIG. 2. In order to provide a thorough understanding of the benefits to be derived from the reset circuitry, the operation of the single shot multivibrator will first be described in a receiver without benefit of that reset circuitry with reference to waveforms *j–l*. Waveform *j* depicts a sinusoidal wave having a frequency of 2,700 Hz. which is applied to the differentiating circuit 32. The differentiating circuit 32 operates on the 2,700 Hz. wave to obtain trigger signals having a frequency of 5,400 Hz. as depicted in waveform *k*. Since every other trigger pulse occurs while the multivibrator is in the astable state, the multivibrator will not be set by each negative going edge of the trigger pulses and the multivibrator output as depicted by waveform *l* has a duty cycle of only 51 percent corresponding to a stable state duration of $$\left(2\times \frac{10^6}{5400}\right)-189=(2\times185)-189=181 \text{ microseconds.}$$

In other words, the second and fourth trigger pulses of the waveform *k* which occur while the multivibrator is in the astable state have no effect since, in the absence of reset circuitry, the timing period represented by the astable pulse width A may only be initiated while the multivibrator is in the stable state S. As may readily be appreciated by examination of the waveform *l*, the average DC value of the waveform measured by the detector 36 is even less than the average DC value of the waveform *c* with a 56 percent duty cycle. Thus, the detector 36 will develop a DC potential for controlling the stylus 40 which erroneously corresponds to a white or "whiter than white" signal. Moreover, the average DC value is below and outside the desired range of operation.

This erratic operation of the multivibrator may be overcome by utilizing the reset circuitry so as to generate narrow reset pulses from the trigger pulses as depicted in waveform *m*. These reset pulses which are substantially coincident with the negative going edge of the trigger pulses in waveform *k* are utilized to reset the multivibrator even though the multivibrator is in the astable state A so as to produce a multivibrator output as shown in waveform *n*. The duty cycle of the waveform *n* is, as in the case of waveform *i*, nearly 100 percent so as to provide an average DC value slightly greater than that corresponding to black so that the acoustic ringing which occurs during the reception of black signals and other signals above the 2,650 Hz. frequency do not substantially change the duty cycle or average DC value of the multivibrator output characteristic of black signals.

Although the precise frequency of the trigger signals corresponding to black and white may vary, the preferred embodiment of the invention which utilizes conventional telephone lines, has an astable state duration such that FM signals having a frequency of 1,500 Hz. will produce trigger pulses of 3,000 Hz. corresponding to the white signal level. FM signals of 2,400 Hz. producing trigger pulses of 4,800 Hz. will correspond to a black signal. The resistor 82 may be appropriately adjusted so that the capacitor 58 charges to a sufficiently high level between trigger pulses during black signal reception to permit the comparator 60 to reset the flip-flop 50. Generally, it is preferred that the astable state duration of the multivibrator cycle be equal to at least 50 percent, perferably 90 percent, of the period between trigger pulses at the highest frequency of operation.

The reset circuitry 46 of the single shot multivibrator 34 has been shown in FIG. 2 in partially schematic and partially block diagram form. In this connection, it should be understood that the portion of the circuitry enclosed within the broken lines of FIG. 2 is available as the NE555 in integrated circuit form from Signetics Corporation. Of course, other single shot multivibrator and reset circuitry may be utilized.

Although other portions of the transmitter and receiving circuitry depicted in FIG. 1 have not been shown in detail herein, such circuitry is shown in detail in aforesaid copending application Ser. No. 417,797 filed Nov. 21, 1973 which is incorporated herein by reference. That application also suggests the use of the Signetics Corporation NE555 but does not suggest the use of the reset capability thereof.

Although a particular embodiment of the invention has been shown and described and various modifications have been suggested, it will be understood that the true spirit and scope of the invention as set forth in the appended claims embrace other modifications and embodiments which will occur to those of ordinary skill in the art.

What is claimed is:

1. A facsimile receiver for producing a copy at a receiving location in response to signals representing light-dark variations in a document at a remote transmitting location, said receiver comprising:

trigger means responsive to said light-dark signals for generating trigger signals having a variable frequency representing light-dark variations in a document;

timing means coupled to said trigger means for timing out periods of predetermined duration, said timing periods being initiated in response to trigger signals;

reset means coupled to said trigger means and said timing means for resetting said timing means in response to trigger signals occurring during said timing periods;

detector means coupled to the output of said timing means for generating a writing control signal varying as a function of the ratio of timing periods to the time between timing periods; and writing means coupled to the output of said timing means for marking on a copy medium to reproduce the light-dark variations of the document on the copy medium in response to said writing control signal.

2. The facsimile receiver of claim 1 wherein said timing means comprises a capacitor charged and discharged in response to said trigger means and said reset means.

3. The facsimile receiver of claim 2 wherein said timing means further comprises a flip-flop set in response to trigger signals, a reference voltage, a voltage comparator coupled to said reference voltage and said capacitor for comparing the reference voltage with the charge on said capacitor and automatically resetting said flip-flop when the charge on the capacitor reaches a predetermined level, and switch means coupled to said reset means for discharging said capacitor in response to each of said trigger signals, the output of said flip-flop being coupled to said detector means.

4. In a facsimile receiver for producing a copy at a receiving location in response to signals representing light-dark variations in a document at a remote transmitting location, said receiver comprising trigger means responsive to said FM signals and noise to generate trigger signals having a variable frequency proportional to the frequency of said FM signals and said noise, a single shot multivibrator coupled to the output of said trigger means for generating a multivibrator output signal having an astable state of fixed duration initiated in response to said trigger signals, the ratio of the astable state duration to stable state duration being directly proportional to the frequency of said trigger signals, detector means coupled to the output of said single shot multivibrator for generating a writing control signal representing said ratio, and writing means coupled to the output of said detector means for marking on a copy medium to reproduce said light-dark variations of said document on said copy medium in response to said writing control signal, the improvement comprising:

reset means coupled to said trigger means for resetting said multivibrator and reinitiating said astable state in response to each of said trigger signals including trigger signals occurring while said multivibrator is in the astable state.

5. The facsimile receiver of claim 4 wherein said multivibrator comprises a capacitor, a flip-flop coupled to said capacitor, a reference voltage, a voltage comparator coupled to said reference voltage and said capacitor for comparing the reference voltage with the charge on said capacitor and automatically resetting said flip-flop when the charge on the capacitor reaches a predetermined level and switch means coupled to said reset means for discharging said capacitor in response to each of said trigger signals, the output of said flip-flop being coupled to said detector means.

* * * * *

UNITED STATES PATENT AND TRADEMARK OFFICE
CERTIFICATE OF CORRECTION

PATENT NO. : 3,916,098

DATED : October 28, 1975

INVENTOR(S) : John M. Vandling

It is certified that error appears in the above-identified patent and that said Letters Patent are hereby corrected as shown below:

Claim 1, line 20, delete "timing" and insert --detector--.

Signed and Sealed this

*twenty-sixth* Day of *July 1977*

[SEAL]

*Attest:*

RUTH C. MASON
*Attesting Officer*

C. MARSHALL DANN
*Commissioner of Patents and Trademarks*